US009299103B1

(12) United States Patent
Bibik, Jr. et al.

(10) Patent No.: US 9,299,103 B1
(45) Date of Patent: Mar. 29, 2016

(54) TECHNIQUES FOR IMAGE BROWSING

(71) Applicant: Amazon Technologies, Inc., Reno, NV (US)

(72) Inventors: Michael Paul Bibik, Jr., Seattle, WA (US); Jonathan David Phillips, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/107,642

(22) Filed: Dec. 16, 2013

(51) Int. Cl.
*G06Q 30/06* (2012.01)
*G06F 3/0487* (2013.01)

(52) U.S. Cl.
CPC .......... *G06Q 30/0641* (2013.01); *G06F 3/0487* (2013.01)

(58) Field of Classification Search
None
See application file for complete search history.

(56) References Cited

U.S. PATENT DOCUMENTS

| | | | | |
|---|---|---|---|---|
| 8,149,214 B2* | 4/2012 | Cho | ...................... | G06F 1/1626 345/156 |
| 8,335,983 B2* | 12/2012 | Pearson et al. | ................ | 715/234 |
| 8,587,528 B2* | 11/2013 | Chaudhri | ...................... | 345/173 |
| 8,645,871 B2* | 2/2014 | Fong et al. | .................... | 715/863 |
| 2009/0007007 A1* | 1/2009 | Voros | ................... | G06F 3/0485 715/786 |
| 2010/0017747 A1* | 1/2010 | Darambazar et al. | ......... | 715/782 |
| 2011/0065482 A1* | 3/2011 | Koide et al. | ................... | 455/566 |
| 2011/0254792 A1* | 10/2011 | Waters et al. | ................. | 345/173 |

OTHER PUBLICATIONS

Richard, Dan, "How to create a diagonal opening blinds transition effect for images in Flash," Tutorials, Articles & SEO by Dan, Sep. 10, 2007. http://www.danrichard.com/2007/09/10/new-tutorial-how-to-create-a-diagonal-opening-blinds-transition-effect-for-images-in-flash/.*

Sonny M. Day, "15 jQuery 360 Degree Image Rotation Plugins" Jul. 28, 2012 http://web.arch ive.org/web/20120801210658/http://www.tripwiremagazine.com/2012/07/jquery-360-degree-image-rotation-plugins.html.*

* cited by examiner

*Primary Examiner* — M. Thein
*Assistant Examiner* — Lance Cai
(74) *Attorney, Agent, or Firm* — Kilpatrick Townsend & Stockton LLP (57) ABSTRACT

A set of images may be obtained by a computing system of a user device. A display may be provided on the user device including a first image of the set of images. An indication may be received that indicates a tilt action of the user device. Based at least in part on the tilt action being within a particular tilt threshold, a partial view of the first image and a partial view of the second image may be provided to the user.

20 Claims, 7 Drawing Sheets

TECHNIQUES FOR IMAGE BROWSING

BACKGROUND

Users of portable electronic devices (e.g., cell phones, tablet PCs) may use various applications to browse electronic marketplace inventory. An item offered in the electronic marketplace often will have images associated with the item. For instance, an item may be available in multiple colors and/or styles. Other users of the marketplace (e.g., other consumers who have purchased the same item) may post digital images of the item, taken from a smart phone, for example. Furthermore, online manufacturers, third-party providers, and/or a service provider of the electronic marketplace may also include additional images of the item (e.g., a front view of the item, a side view of the item). It is often the case that the user is required to select a navigational interface (e.g., a "next" button), or use a "swiping" gesture that includes dragging a finger along the device screen, in order to navigate between images. Both techniques may prove cumbersome. Techniques that provide navigation less awkwardly, while providing greater entertainment value, are desirable as they may increase the user's overall browsing experience.

BRIEF DESCRIPTION OF THE DRAWINGS

Various embodiments in accordance with the present disclosure will be described with reference to the drawings, in which.

DETAILED DESCRIPTION

In the following description, various embodiments of the present disclosure will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the process described may be performed under the control of one or more computer systems configured with specific computer-executable instructions and may be implemented as code (e.g., executable instructions, one or more computer programs or one or more applications) executing collectively on one or more processors, by hardware or combinations thereof. The code may be stored on a non-transitory computer-readable storage medium, for example, in the form of a computer program including a plurality of instructions executable by one or more processors. The computer-readable storage medium may be non-transitory.

Techniques described herein are directed to systems and methods to enable a user of an electronic device to utilize a tilt display feature and/or service to navigate from one image to another within a set of images. In accordance with at least one embodiment, a user may utilize a tilt display feature and/or service to obtain the set of images. For instance, the set of images may include 10 images of an item offered in an electronic marketplace (or otherwise), each image depicting the item in 1 of 10 colors available for purchase. The set of images may be downloaded by the tilt display service and stored locally or remotely. Alternatively, the tilt display feature and/or service (hereinafter referred interchangeably as "feature" or "service") may obtain access to the set of images without downloading the set of images. In some examples, the tilt display service may communicate motion input from the device to the electronic marketplace service provider. For instance, the tilt display service may receive input gathered by at least one gyroscope, accelerometer, altimeter, camera, or other suitable hardware capable of ascertaining movement or orientation of the electronic device. The received input may indicate that the device has been moved from a substantially flat position to being tilted to the right at an angle of five degrees. The tilt display service may use the received input to determine navigational actions to take with regard to the set of images. In this example, the received input indicating a tilt position of five degrees may cause the tilt display service to display 75% of the first image simultaneously alongside 25% of the second image. In some examples, the ratio between the displayed portions of the first and second images may be proportionally updated based on the degree of the tilt position. In some examples, the tilt display service may be executed or otherwise hosted from a service provider computer accessible over a network. In this way, a user device may provide information about actions of a user utilizing the user device to the service provider and the tilt display service may respond with instructions and/or appropriate data. However, in other examples, the tilt display service may be executed locally on the user device.

In one non-limiting example, a user could first view one image of the set of images. The user may decide that he wants to "peek" at the next image in the set. To accomplish such a task, the user may tilt the device. If the angle of tilt is less than a predetermined tilt threshold angle, then the tilt display service may cause a portion of the first image and a portion of the second image to be simultaneously provided to the user. In this manner, a user may "peek" at the second image without actually navigating to the second image.

As used herein, "transition" is directed to the action of changing a display from one image to another. It includes replacing one image with another as well as transitional animations. As used herein, "transitional animations" may include a lenticular animation, a wipe animation, a cross-fade animation, a fade-in animation, a fade-out animation, or any suitable animation known in the art, to change a display of one image to a display of another image. A suitable animation is one that is capable of being used to change the display of one image to the display of another image and would be apparent to one skilled in the art. Additionally, transitional animation may comprise multiple animations executed sequentially or simultaneously. As used herein, "tilting" refers to the action of positioning a user device in such a manner that the user device is tilted with respect to an initial position, a general resting position, and/or the ground (or horizontal surface). A tilted user device has at least one side positioned higher or lower than another side of the user device. As used herein, a "sensor" may include a gyroscope, an accelerometer, altimeter, camera, other suitable hardware capable of ascertaining movement or orientation of a user device, or any combination of the above.

Continuing with the previous example, as the user tilts the device further, he may eventually surpass the tilt threshold angle. As a result, the current display might transition to a display of the second image. For instance, if the user was originally viewing the first image and tilted the device over the tilt threshold angle, then the first image display may transition directly to the second image display. In another example, the user may currently be "peeking" such that a portion of both the first and second images are viewable to the user. In this case, once the user tilts the device past the tilt threshold angle, the portion of both the first and second images may be transitioned to, and eventually replaced with, the second image in its entirety.

In accordance with at least one embodiment, the user may begin viewing the first image. The user may then begin to tilt the electronic device. Input from sensors on the electronic device may be received by the tilt display service and processed in rapid succession. In this manner, the portion of the first and second images viewable to the user may be updated substantially at the same time and at the same rate as the tilt is increased. The greater the tilt, the more of the second image is viewable until the tilt threshold angle is reached. Once the tilt threshold angle is reached, the display may transition to the second image in its entirety. Once a transition is complete, the once second image may become the current image and may be treated as a new first image for purposes of subsequent tilting.

In at least one example, a user may tilt the device, surpassing the tilt threshold angle. The user may further choose to maintain this tilt angle after a first flip has occurred. The maintained tilt angle may cause the tilt display service to transition directly from the current image to the next image. In at least one example where the tilt angle is maintained, each subsequent flip may occur faster with respect to the previous flip, with each subsequent flip occurring quicker as a function of time since the tilt was initiated. In this manner, a user may increase the speed at which he navigates through a set of images by tilting and holding the tilt in the direction of desired navigation.

In another non-limiting example, a user may initiate a rotational view mode of an item offered by the electronic marketplace. For instance, the item may be associated with a set of images that make a rotational display possible. The rotational display may depict what the item may look like from multiple angles. In such an example, the user may tilt the device in the direction he wishes to rotate the image display. Consequently, the tilt display service may cause the set of images to be displayed sequentially at a speed proportional to the tilt angle of the electronic device. As a result, the images may cause the item to appear to rotate on a fixed axis. In some examples, if the user tilts the device slightly, the images may be displayed such that an item appears to rotate fairly slowly. If the user increases the tilt, the rotation speed may increase proportionally.

Though the aforementioned examples describe "peeking" and "flipping" to the next image in the set of images, it should be appreciated that the same techniques may be used to "peek" or "flip" to a previous image, or previous images, in the set of images.

Figure 1:
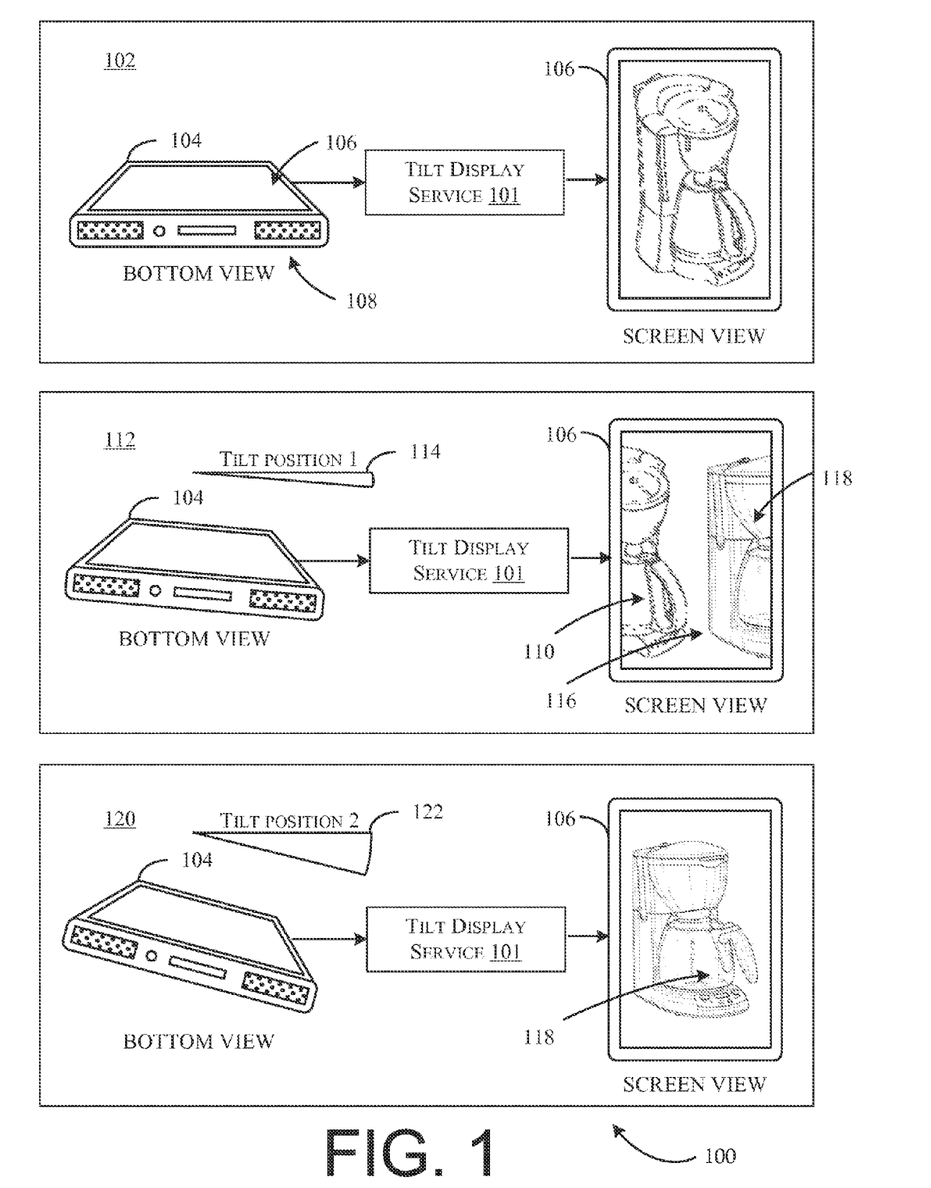
FIG. 1 illustrates a method for utilizing a tilt display service in accordance with at least one embodiment.

Referring now to the drawings, in which like reference numerals represent like parts, FIG. 1 illustrates a method 100 for utilizing a tilt display service 101 in accordance with at least one embodiment. For example, in use case 102, a user device 104 (e.g., a cell phone) having a display screen 106 may be positioned at a substantially flat position 108. The user may utilize the user device 104 to select a set of images to view. For instance, the user may access an application via the user device 104 in order to browse to an item offered for sale on an electronic marketplace. The user may then select a set of images of the item via user device 104. The set of images may be obtained by the tilt display service 101. When user device 104 is positioned at substantially flat position 108, the tilt display service 101 may cause display screen 106 to present the user with a display of the first image of the set of images, in this example, a picture of a first coffee maker 110.

In accordance with at least one embodiment, use case 112 depicts user device 104 tilted to a first tilt position 114. At such a position, the tilt display service 101 may cause a "peek" display 116 to be provided to the user via display screen 106. The "peek" display 116 may depict a portion of the first coffee maker 110 and a portion of a second image of the set of images, in this example, the second image comprising a second coffee maker 118. Though the "peek" display 116 in this example depicts approximately equal portions of each image, it should be appreciated that the "peek" display 116 may provide more of the image of the first coffee maker 110 than the image of the second coffee maker 118. Alternatively, the "peek" display 116 may display more of the image of the second coffee maker 118 than the image of the first coffee maker 110. The relative proportion of the displayed portion of the first coffee maker 110 as compared to the second coffee maker 118 may be based at least in part on the degree of tilt of the first tilt position 114.

In accordance with at least one embodiment, use case 120 depicts the user device 104 tilted to a second tilt position 122. In at least one example, the second tilt position 122 may be a greater tilt angle than the first tilt position 114. At this position, the tilt display service 101 may transition from the "peek" display 116 to a display comprising the second image of the set of images in its entirety. In this example, display screen 106 may transition from providing "peek" display 116 to providing the whole image of the second coffee maker 118.

Thus, in this manner, a method for image browsing is enabled.

Figure 2:
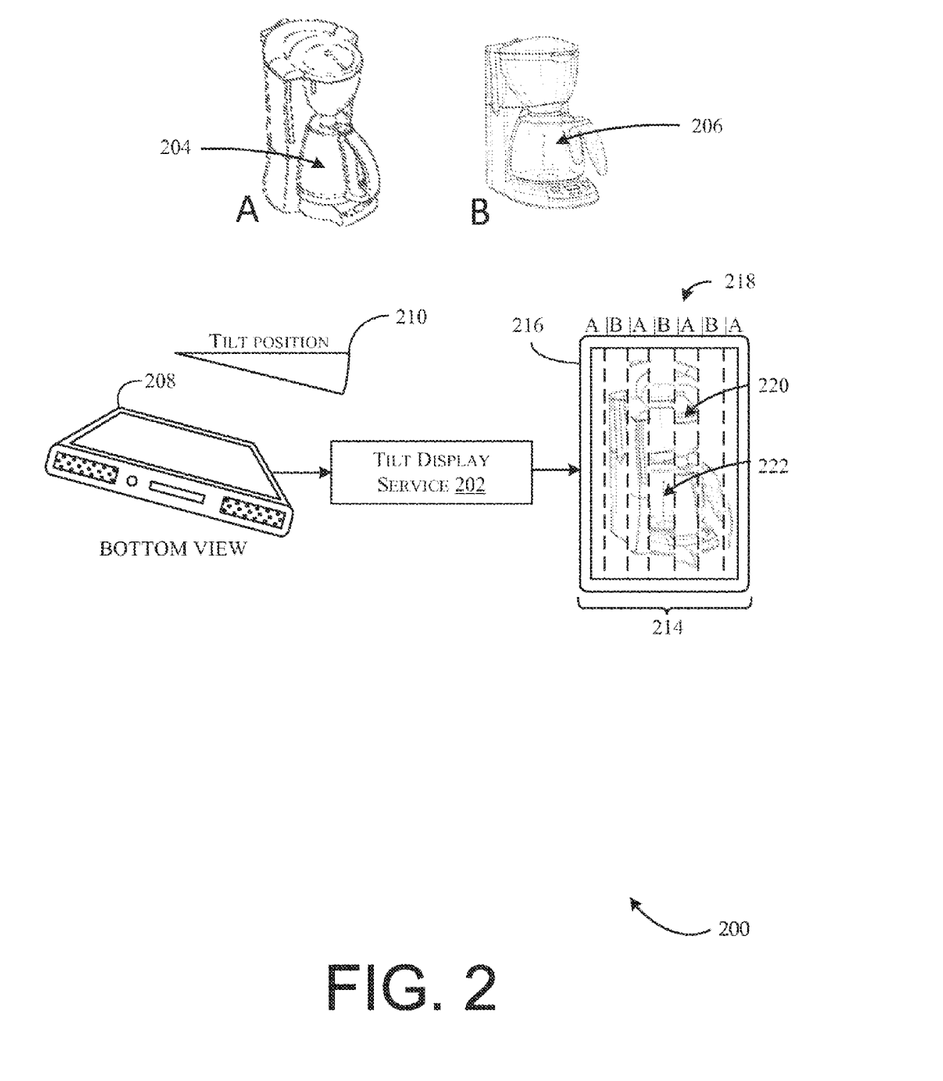
FIG. 2 illustrates an example transition generated by the tilt display service in accordance with at least one embodiment.

FIG. 2 illustrates an example transition 200 generated by the tilt display service 202 (e.g., the tilt display service 101) in accordance with at least one embodiment. Consider the example where the set of images comprises image A 204 and image B 206. A user device 208 (e.g., the user device 104) may be tilted to a tilt position 210 (e.g., the second tilt position 122). User device 208 may comprise a cell phone, tablet PC, or other suitable electronic device that includes sensors capable of determining movement or orientation of the electronic device. At such a position, a tilt display service 202 may cause a transitional animation 214 to be provided to the user via display screen 216 (e.g., display screen 106). In at least one example, transitional animation 214 may comprise a lenticular animation. Accordingly, the transitional animation 214 may depict an overlay view of image A 204 and image B 206 where alternating vertical portions of image A 204 and image B 206 are depicted by vertical portion sequence 218. In this example, vertical portions 220 may be substantially the same width as vertical portions 222. However, it should be appreciated that as the transitional animation 214 is executed, the width of vertical portions 220 may narrow while the width of vertical portions 222 may simultaneously widen.

In accordance with at least one embodiment, transitional animation 214 may comprise a wipe animation, a cross-fade animation, a fade-in animation, a fade-out animation, or any suitable animation known in the art, to change a display of one image to a display of another image. A suitable animation is one that is capable of being used to change the display of one image to the display of another image and would be apparent to one skilled in the art. Additionally, transitional animation 214 may comprise multiple animations executed sequentially or simultaneously.

Figure 3:
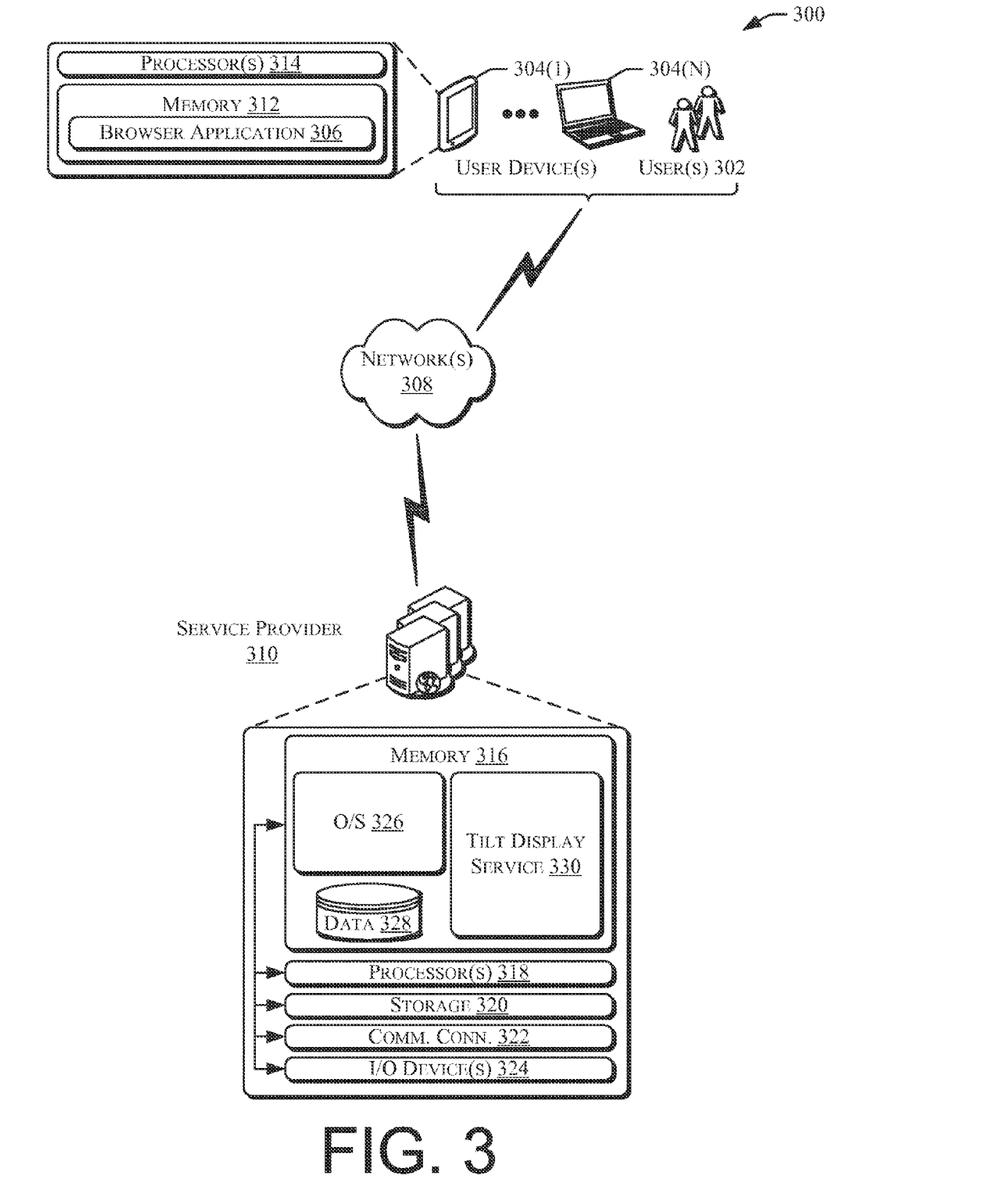
FIG. 3 illustrates an example architecture for providing the tilt display service, in accordance with at least one embodiment.

FIG. 3 illustrates an example architecture 300 for providing the tilt display service (e.g., tilt display service 101), in accordance with at least one embodiment. In architecture 300, one or more users 302 (e.g., consumers of an electronic marketplace) may utilize user computing devices 304(1)-(N) (collectively, user computing devices 304) to access a browsing application 306 (e.g., an application that enables the consumer to browse items offered by an electronic marketplace) or a user interface accessible through the browsing application 306 via one or more networks 308. In some aspects, the browsing application 306 may be hosted, managed, and/or provided by a computing resources service or service provider, such as by utilizing one or more service provider computers 310. The one or more service provider computers 310 may, in some examples, provide computing resources such as, but not limited to, client entities, low latency data storage, durable data storage, data access, management, virtualization, cloud-based software solutions, electronic content performance management, etc. The one or more service provider computers 310 may also be operable to provide web hosting, computer application development, and/or implementation platforms, combinations of the foregoing, or the like to the one or more users 302.

In some examples, the networks 308 may include any one or a combination of many different types of networks, such as cable networks, the Internet, wireless networks, cellular networks, and other private and/or public networks. While the illustrated example represents the users 302 accessing the browsing application 306 over the networks 308, the described techniques may equally apply in instances where the users 302 interact with the service provider computers 310 via the one or more user computing devices 304 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browsing application 306 may allow the users 302 to interact with the service provider computers 310, such as to access information associated with items offered for sale via an electronic marketplace. The one or more service provider computers 310, perhaps arranged in a cluster of servers or as a server farm, may host the browsing application 306 and/or cloud-based software services. Other server architectures may also be used to host the browsing application 306 and/or cloud-based software services. The browsing application 306 may be capable of handling requests from many users 302 and serving, in response, various user interfaces that can be rendered at the user computing devices 304 such as, but not limited to, perceived latency or the like. The browsing application 306 can provide any type of website that supports user interaction, including search engine sites. As discussed above, the described techniques can similarly be implemented outside of the browsing application 306, such as with other applications running on the user computing devices 304.

The user computing devices 304 may be any type of computing device such as, but not limited to, a mobile phone, a smart phone, a desktop computer, a personal digital assistant (PDA), a laptop computer, a tablet PC, an electronic book (e-book) reader, etc. User computing devices 304 may include a gyroscope, an accelerometer, an altimeter, or any suitable hardware sensor capable of detecting movement or orientation of user computing devices 304. In some examples, the user computing devices 304 may be in communication with the service provider computers 310 via the networks 308, or via other network connections. Additionally, the user computing devices 304 may be part of the distributed system managed by, controlled by, or otherwise part of the service provider computers 310.

In one illustrative configuration, the user computing devices 304 may include at least one memory 312 and one or more processing units (or processor(s)) 314. The processor(s) 314 may be implemented as appropriate in hardware, computer-executable instructions, firmware, or combinations thereof. Computer-executable instructions or firmware implementations of the processor(s) 314 may include computer-executable or machine-executable instructions written in any suitable programming language to perform the various functions described.

The memory 312 may store program instructions that are loadable and executable on the processor(s) 314, as well as data generated during the execution of these programs. Depending on the configuration and type of user computing devices 304, the memory 312 may be volatile (such as random access memory (RAM)) and/or non-volatile (such as read-only memory (ROM), flash memory, etc.). The user computing devices 304 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 312 may include multiple different types of memory, such as static random access memory (SRAM), dynamic random access memory (DRAM), or ROM.

Turning to the contents of the memory 312 in more detail, the memory 312 may include an operating system and one or more application programs, modules, or services for implementing the features disclosed herein including at least the perceived latency, such as via the browsing application 306 or dedicated applications (e.g., smart phone applications, tablet applications, etc.). The browsing application 306 may be configured to receive, store, and/or interact with service provider computers 310. Additionally, the memory 312 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

In some aspects, the service provider computers 310 may be any type of computing devices such as, but not limited to, a mobile phone, a smart phone, a personal digital assistant (PDA), a laptop computer, a desktop computer, a server computer, a thin-client device, a tablet PC, etc. Additionally, it should be appreciated that, in some embodiments, the service provider computers 310 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computers 310 may be in communication with the user computing devices 304 and/or other service providers via the networks 308, or via other network connections. The service provider computers 310 may include one or more servers, perhaps arranged in a cluster, as a server farm, or as individual servers not associated with one another. These servers may be configured to implement the tilt display functionality described herein as part of an integrated, distributed computing environment.

In one illustrative configuration, the service provider computers 310 may include at least one memory 316 and one or more processing units (or processor(s)) 318. The processor(s) 318 may be implemented as appropriate in hardware, computer-executable instructions, firmware, or combinations thereof. Computer-executable instructions or firmware implementations of the processor(s) 318 may include computer-executable or machine-executable instructions written in any suitable programming language to perform the various functions described.

The memory 316 may store program instructions that are loadable and executable on the processor(s) 318, as well as data generated during the execution of these programs. Depending on the configuration and type of service provider computers 310, the memory 316 may be volatile (such as RAM) and/or non-volatile (such as ROM, flash memory, etc.). The service provider computers 310 or servers may also include additional storage 320, which may include removable storage and/or non-removable storage. The additional storage 320 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 316 may include multiple different types of memory, such as SRAM, DRAM, or ROM.

The memory 316 and the additional storage 320, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 316 and the additional storage 320 are examples of computer storage media. Additional types of computer storage media that may be present in the service provider computers 310 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 310. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 310 may also contain communications connection(s) 322 that allow the service provider computers 310 to communicate with a stored database, another computing device or server, user terminals and/or other devices on the networks 308. The service provider computers 310 may also include I/O device(s) 324, such as a keyboard, a mouse, a pen, a voice input device, a touch input device, a display, speakers, a printer, etc.

Turning to the contents of the memory 316 in more detail, which will be described in further detail in FIG. 4, the memory 316 may include an operating system 326, one or more data stores 328, and/or one or more application programs, modules, or services for implementing the features disclosed herein including a tilt display service 330.

Figure 4:
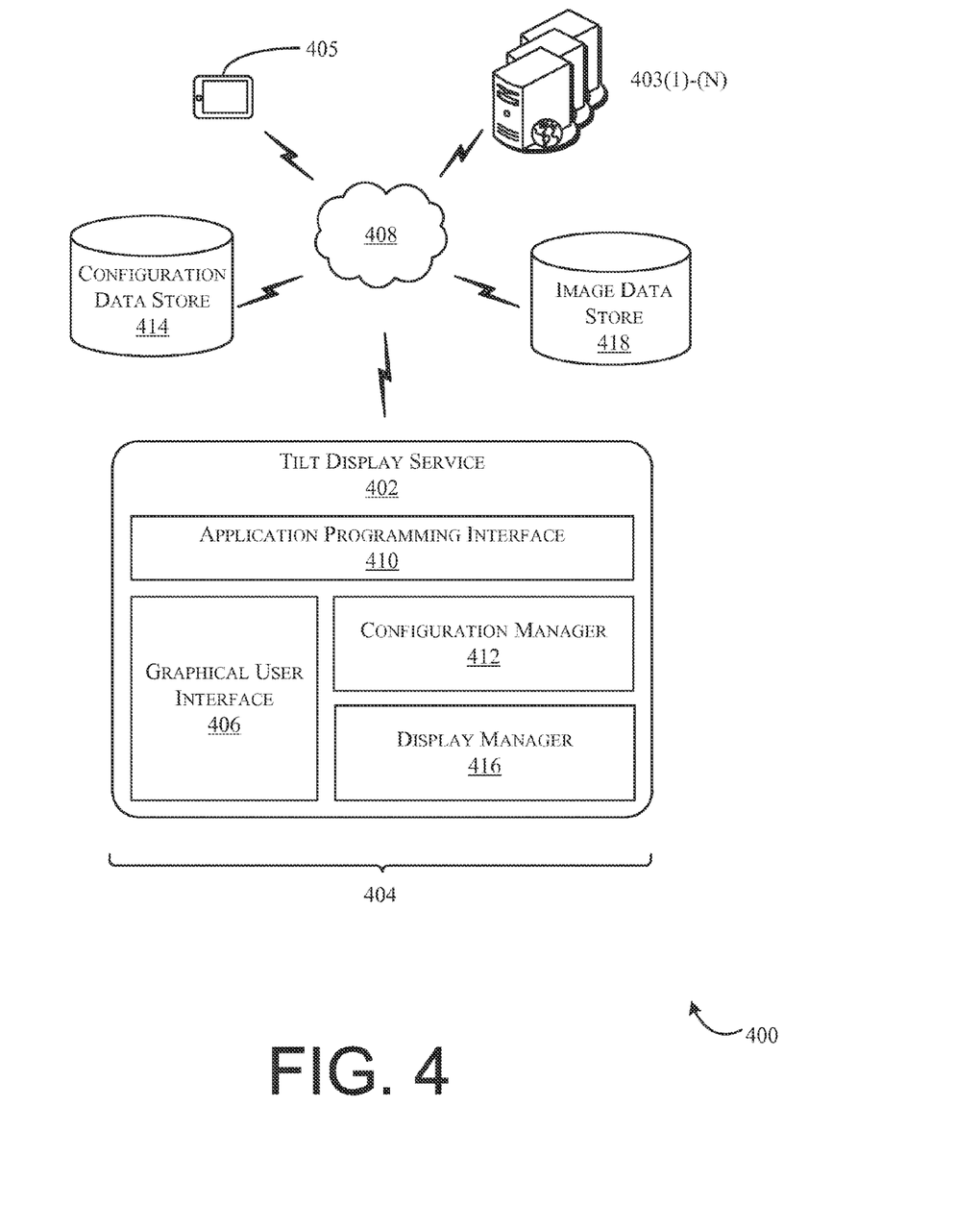
FIG. 4 schematically illustrates an example computer architecture for the tilt display service, including a plurality of modules that may carry out various embodiments.

FIG. 4 schematically illustrates an example computer architecture 400 for the tilt display service 402 (e.g., the tilt display service 101), including a plurality of modules that may carry out various embodiments. The modules 404 may be software modules, hardware modules, or a combination thereof. If the modules 404 are software modules, the modules 404 can be embodied on a computer-readable medium and processed by a processor in any of the computer systems described herein. It should be appreciated that any module or data store described herein might be, in some embodiments, a service responsible for managing data of the type required to make corresponding calculations. The modules may be configured in the manner suggested in FIG. 4 or may exist as separate modules or services external to the tilt display service 402.

In accordance with at least one embodiment, a method is enabled for browsing through a set of images. For example, the tilt display service 402 may be a component of user device 405 (e.g., user computing devices 304). Alternatively, the tilt display service may be a component of the service provider computers 403 (e.g., the service provider computers 310).

In accordance with at least one embodiment, a user may configure the tilt display service 402 via a graphical user interface 406, a component of the tilt display service 402. The user may enter configuration information via user device 405 (e.g., user computing devices 304) communicating via network 408 (e.g., networks 308). Alternatively, configuration information may be obtained from any sources including, but not limited to, an administrator, an application programmer, and/or a user. Configuration information may include, but is not limited to, a "flat" threshold angle, a "flip" threshold angle, transition preferences, and speed settings. The "flat" threshold angle may indicate an upper maximum angle under which the user device 405 may be deemed to be at a flat position. For instance, a user may decide that the "flat" threshold angle may be an angle of two degrees. In this example, any angle of tilt under two degrees may be interpreted as if user device 405 was positioned with a zero degree tilt. A "flip" threshold angle may be configured that may indicate the angle at which an image should be replaced with the previous or next image in the set of images. Whether the image should be replaced with the previous or next image in the set of images may depend on the direction in which the user device 405 is tilted. The speed setting may be configured by the user to increase or decrease the pace at which transitions executed by the tilt display service 402 occur.

In accordance with at least one embodiment, once information is entered via graphical user interface 406, application programming interface 410, a component of tilt display service 402, may be utilized to communicate the information to tilt display service 402.

In at least one example, configuration manager 412, a component of the tilt display service 402, may be configured to receive configuration information from a user of the user device 405. The configuration manager 412 may be responsible for creating and maintaining a user profile utilized to store such configuration information. Further, the configuration manager may cause such configuration data to be stored within the tilt display service 402 and/or configuration data store 414, a data store being a type utilized for storing such configuration data.

In accordance with at least one embodiment, a user may utilize a browsing application (e.g., the browsing application 306) to navigate and select a set of images provided by service provider computers 403. Display manager 416, a component of tilt display service 402, may be configured to receive such information. Upon receipt, display manager 416 may utilize application programming interface 410 to retrieve the selected set of images from service provider computers 403. On retrieval (e.g., download), display manager 416 may cause the set of images to be stored in image data store 418. Alternatively, the display manager 416 may utilize the application programming interface 410 to gain access to the selected set of images located on service provider computers 403 or a data store remote to tilt display service 402.

In accordance with at least one embodiment, device information may be detected by sensors of user device 405 and communicated, via the application programming interface 410, to tilt display service 402. Device information may include information pertaining to an angle, an altitude, and/or an orientation at which the user device 405 may be positioned. Display manager 416 may be configured to receive the device information. Display manager 416 may determine that a transition from one image of the set of images to another image of the set of images should occur. The determination may be based on the received device information. For instance, as described in previous examples, device information may indicate that user device 405 is positioned at an angle of five degrees to the right. As a result, display manager 416 may cause a "peek" display to be provided to the user via user device 405 where the "peek" display provides a portion of the first image and a portion of the second image. Alternatively, display manager 416 may cause service provider computers 403 to cause a "peek" display to be provided to the user via the user device 405.

In accordance with at least one embodiment, in response to receiving device information, display manager 416 may access configuration data from configuration data store 414 to determine what, if any, transition to use. For instance, perhaps configuration information indicates that the "flip" threshold value is fifteen degrees and that a lenticular animation should be used when transitioning between images. Additionally, assume that the received device information indicates the device is tilted 16 degrees to the right. In at least one example, the display manager 416, utilizing the example configuration information and example device information, may cause a lenticular animation to be executed causing a transition from the current display to the next image in the set of images in the manner described in FIG. 2.

Figure 5:
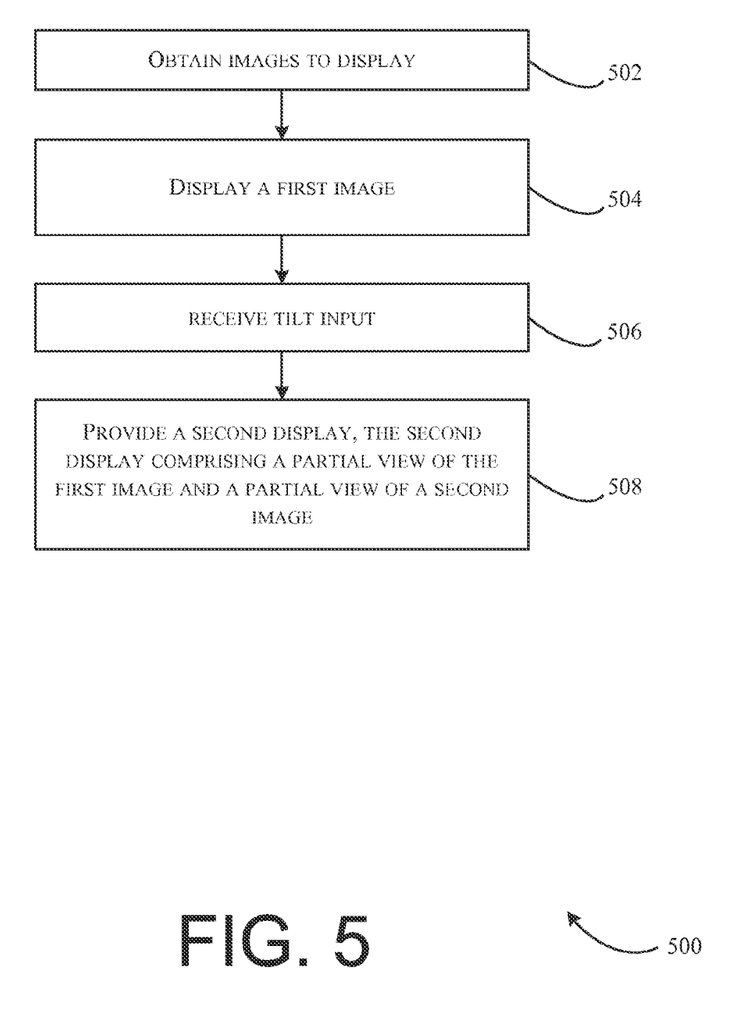
FIG. 5 is a flowchart illustrating a method for utilizing the tilt display service described herein, in accordance with at least one embodiment.

FIG. 5 is a flowchart illustrating a method for utilizing the tilt display service described herein, in accordance with at least one embodiment. The flow 500 may begin at 502 where a tilt display service (e.g., tilt display service 101) obtains images to display. As described above, the images may be obtained by download, or may be otherwise accessible to the tilt display service 101. At 504, tilt display service 101 may display a first image. The first image may comprise, for instance, an image of a blue coffee maker. At 506, tilt input may be received by the tilt display service 101. Tilt input may comprise information gathered by sensors of an electronic device indicating a particular movement or orientation of the electronic device. For example, the tilt input may indicate that the device is positioned at an eight degree tilt to the right. As a result, the tilt display service 101 may cause a second display to be provided at 508, the second display comprising a partial view of the first image and a partial view of the second image.

Figure 6:
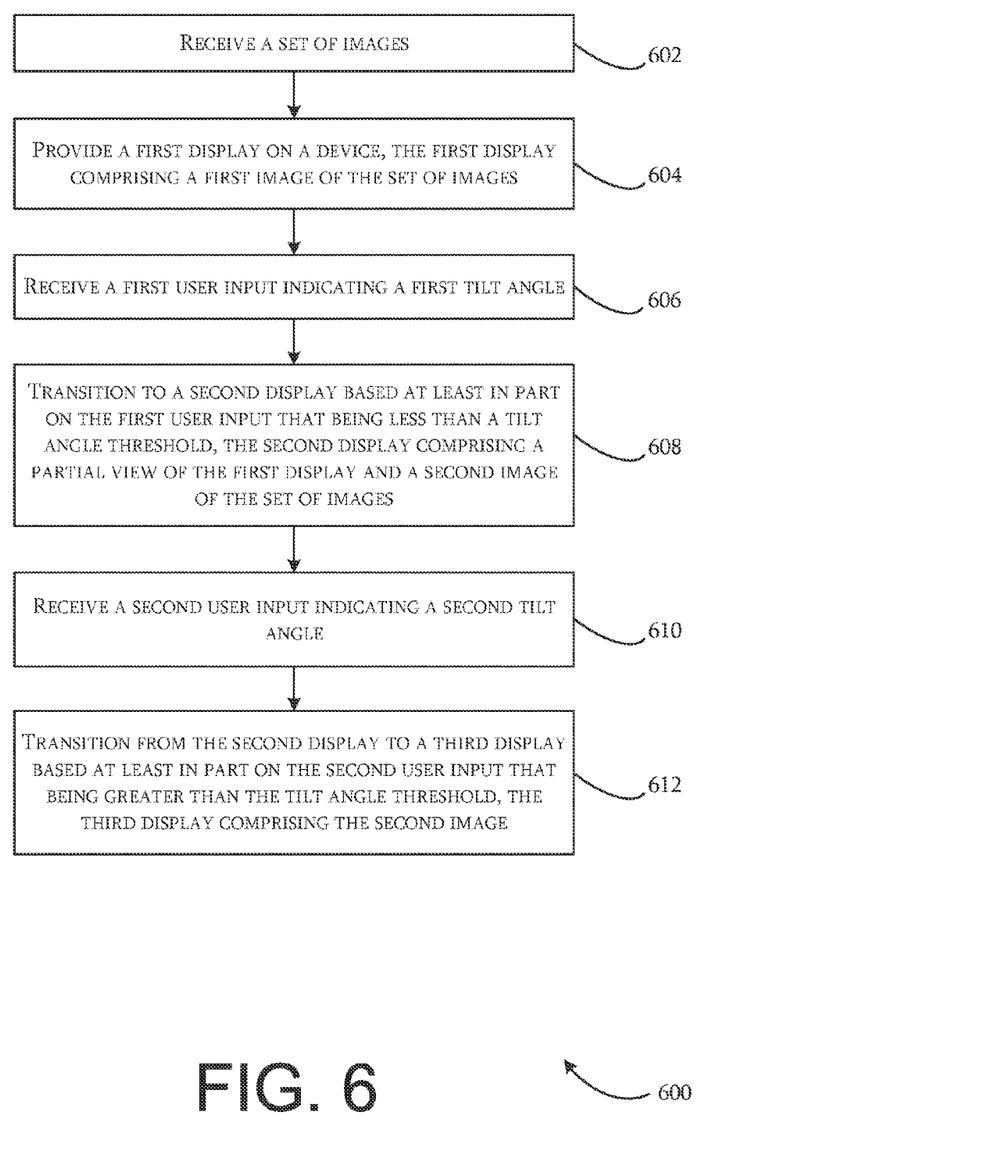
FIG. 6 is a flowchart illustrating a method for utilizing the tilt display service described herein, in accordance with at least one further embodiment.

FIG. 6 is a flowchart illustrating a method for utilizing the tilt display service (e.g., tilt display service 101) described herein, in accordance with at least one further embodiment. The flow 600 may begin at 602 where a set of images may be received. In at least one example, the set of images may be received from service provider computers (e.g., service provider computers 310) or some other data store responsible for storing such images. At 604, the tilt display service 101 may cause a first display to be provided on a device (e.g., user device 104), the first display comprising a first image of the set of images. In at least one example, the first display may comprise an image of a blue coffee maker. At 606, the tilt display service may receive a first user input. In some example, the first user input may indicate a first tilt position (e.g., a tilt of eight degrees to the right). At 608, the tilt display service 101 may transition to providing a second display based at least in part on the first user input being less than a tilt angle threshold, the second display comprising a partial view of the first display and a second image of the set of images. In some examples, the partial view of the first display and the partial view of the second image may comprise a "peak" display. In other examples, the partial view of the first display and the partial view of the second image may comprise a transitional animation (e.g., the transitional animation 214). The tilt angle threshold may be set to fifteen degrees, for instance. In at least one example, the second image may comprise an image of a red coffee maker. In at least one example, the second display may comprise a partial view of the blue coffee maker and a partial view of the red coffee maker. At 610, the tilt display service 101 may receive a second user input. The second user input, in some examples, may indicate that the tilt of the device has been increased to sixteen degrees to the right. At 612, the tilt display service 101 may transition from the second display to a third display based at least in part on the second user input indicating a tilt position greater than the tilt angle threshold, the third display comprising the second image. Continuing with the current example, the second display comprising the partial view of the blue coffee maker and the partial view of the red coffee maker may be transitioned to a display of the red coffee maker alone. As discussed in the figures above, the transition may include a lenticular animation or any suitable animation known in the art.

Figure 7:
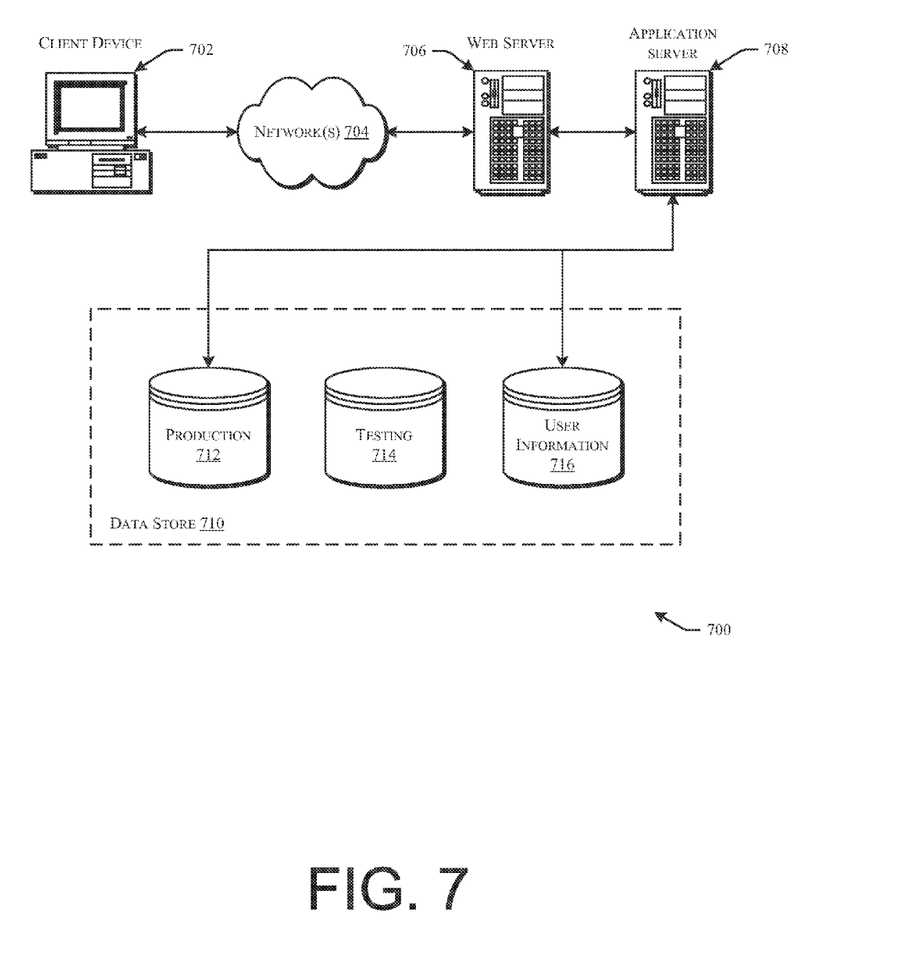
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be appreciated that there can be several application servers, layers, or other elements, processes or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 702 and the application server 708, can be handled by the Web server. It should be appreciated that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. Also, the data store is shown to include a mechanism for storing log data 714, which can be used for reporting, analysis, or other such purposes. It should be appreciated that there can be many other aspects that may need to be stored in the data store, such as for page image information and to access right information, which can be stored in any of the above-listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the environment 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including, without limitation, those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be appreciated, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A non-transitory computer-readable storage medium having stored thereon computer-executable instructions that, when executed by a processor, cause the processor to perform operations comprising:
   receiving a set of images from an electronic marketplace;
   providing, on a display of a user device, a first view comprising a first image of the set of images, wherein the set of images individually include a same item;

receiving a first user input indicating a tilt position;

determining multiple portions of the first image and multiple portions of the second image;

providing, on the display of the user device, a second view based at least in part on the first user input being greater than a tilt angle threshold, the second view comprising an overlaid image of the first image and the second image, the overlaid image depicting the multiple portions of both the first image and the second image being arranged in an alternating pattern within the display of the user device;

providing, on the display of the user device, a third view based at least in part on a second user input being greater than the tilt angle threshold, the third view comprising the second image;

transitioning from the third view to a fourth view based on an indication of a maintained tilt being greater than the tilt angle threshold, the transitioning occuring after a predetermined period of time has elapsed, the fourth view comprising a third image of the set of images;

determining that the maintained tilt has been maintained for the predetermined period of time; and providing subsequent displays based at least in part on the determination that the maintained tilt has been maintained for the predetermined period of time, wherein time elapsed between the provided subsequent displays decreases as a function of time.

2. The non-transitory computer-readable storage medium of claim 1, wherein the multiple portions of the first image and the multiple portions of the second image vary in width or height.

3. The non-transitory computer-readable storage medium of claim 1, having further instructions that, when executed by the processor, cause the processor to perform operations comprising:

providing, on the display of the user device, the fourth view after a predetermined period of time has elapsed, the fourth view comprising the third image of the set of images.

4. The non-transitory computer-readable storage medium of claim 1, having further instructions that, when executed by the processor, cause the processor to perform operations comprising:

modifying a first set of image widths corresponding to the multiple portions of the first image based at least in part on a first tilt position;

receiving a second user input indicating a second tilt position;

determining that the second tilt position is greater than the tilt position; and increasing the first set of image widths corresponding to the multiple portions of the first image based at least in part on the determination that the second tilt position is greater than the tilt position.

5. The non-transitory computer-readable storage medium of claim 4, having further instructions that, when executed by the processor, cause the processor to perform operations comprising:

modifying a second set of image widths corresponding to the multiple portions of the second image based at least in part on the first tilt position; and decreasing the second set of image widths corresponding to the multiple portions of the second image based at least in part on the determination that the second tilt position is greater than the first tilt position.

6. A computer-implemented method, comprising:

receiving, by a computer system of a mobile device, a set of images identifying an item offered in an electronic marketplace;

providing a first display on the mobile device, the first display comprising a first image of the set of images;

receiving a first user input indicating a first tilt angle;

transitioning to a second display based at least in part on the user input being less than a tilt angle threshold, the second display comprising a partial view of the first image and a partial view of a second image of the set of images, the partial view of the first image and the partial view of the second image being an animated overlaid image of the first image and the second image, the overlaid image depicting alternating viewable portions of the first image with viewable portions of the second image;

receiving a second user input indicating a second tilt angle that is greater than the first tilt angle;

transitioning from the second display to a third display based at least in part on the second user input being greater than the tilt angle threshold, the third display comprising the second image in its entirety;

transitioning from the third display to a fourth display based on an indication of a maintained tilt being greater than the tilt angle threshold after a predetermined period of time has elapsed, the fourth display comprising a third image of the set of images;

determining that the maintained tilt has been maintained for the predetermined period of time; and providing subsequent displays based at least in part on the determination that the maintained tile has been maintained for the predetermined period of time, wherein time elapsed between the provided subsequent displays decreases as a function of time.

7. The computer-implemented method of claim 6, wherein the first user input and the second user input are submitted utilizing at least one of an accelerometer, a gyroscope, or a camera of the mobile device.

8. The computer-implemented method of claim 6, wherein the second image is a subsequent image in the set of images relative to the first image.

9. The computer-implemented method of claim 6, wherein the second image is a preceding image in the set of images relative to the first image.

10. The computer-implemented method of claim 6, wherein providing the subsequent displays includes providing subsequent images of the set of images based at least in part on a tilt angle, wherein the subsequent displays individually presenting a view of the item at a second angle that is different than the first angle, and wherein providing the subsequent images causes a visual representation of the item to appear to rotate on a fixed axis.

11. The computer-implemented method of claim 10, wherein the set of images are displayed sequentially at a speed proportional to the tilt angle.

12. The method of claim 11, wherein a first speed at which the subsequent displays are individually presented is based at least in part on the tilt angle.

13. The method of claim 12, further comprising:

receiving user input indicating a subsequent tilt angle; and providing additional subsequent displays of additional subsequent images of the set of images based at least in part on the subsequent tilt angle, wherein a second speed at which the additional subsequent displays are individually presented is based at least in part the subsequent tilt angle, and wherein the second speed is faster than the first speed when the subsequent tilt angle is greater than the tilt angle.

14. A system, comprising:
a processor; and
a memory storing computer-executable instructions that, when executed by the processor, cause the system to at least:
- receive a plurality of images;
- provide, on a display of a user device, a first view comprising a first image of the plurality of images;
- receive a first user input indicating a first tilt position;
- provide, on the display of the user device, a second view based at least in part on the first user input being less than a tilt angle threshold, the second view comprising one portion of the first image visually located adjacent to one portion of the second image;
- receive a second user input indicating a second tilt position;
- provide, on the display of the user device, a third view based at least in part on the second user input being greater than the first tilt position, the third view comprising the second image of the plurality of images;
- transition from the third view to a fourth view based on an indication of a maintained tilt being greater than the tilt angle threshold, the transition occurring after a predetermined period of time has elapsed, the fourth view comprising a third image of the plurality of images;
- determine that the maintained tilt has been maintained for the predetermined period of time; and
- provide subsequent displays based at least in part on the predetermined period of time and the determination that the maintained tile has been maintained for the predetermined period of time, wherein time elapsed between the provided subsequent displays decreases as a function of time.

15. The system of claim 14, wherein the plurality of images are received from an electronic marketplace.

16. The system of claim 14, wherein the first image visually depicts an item as viewed from a first angle.

17. The system of claim 16, wherein providing the subsequent displays includes providing a subsequent image of the plurality of images, the subsequent image visually depicting the item as viewed from a second angle that is different than the first angle.

18. The system of claim 14, having further instructions that, when executed by the processor, cause the system to at least:
- receive a second user input indicating a maintained tilt position; and
- based on the second user input, provide, at a first speed, subsequent views individually comprising subsequent images of the plurality of images according to the second user input, the subsequent displays individually depicting the item as viewed from another angle different that the first angle or second angle.

19. The system of claim 18, having further instructions that, when executed by the processor, cause the system to at least:
- receive a third user input indicating an increased tilt position, the increased tilt position being greater than the maintained tilt position; and
- based on the third user input, provide at least one subsequent image of the plurality of images at a second speed, the second speed being faster than the first speed.

20. The system of claim 19, having further instructions that, when executed by the processor, cause the system to at least:
- receive a fourth user input indicating a decreased tilt position, the decreased tilt position being less than the increased tilt position; and
- based on the fourth user input, provide at least one subsequent image of the plurality of images at a third speed, the third speed being slower than the second speed.

* * * * *